(12) United States Patent
Moreno

(10) Patent No.: US 7,896,744 B2
(45) Date of Patent: Mar. 1, 2011

(54) METHOD OF DEVELOPING THE ACTIVITY OF AN ON-LINE GAME SITE

(75) Inventor: Roland Moreno, Paris (FR)

(73) Assignee: Innovation, Paris (FR)

( * ) Notice: Subject to any disclaimer, the term of this patent is extended or adjusted under 35 U.S.C. 154(b) by 950 days.

(21) Appl. No.: 11/802,774

(22) Filed: May 24, 2007

(65) Prior Publication Data

US 2008/0293493 A1     Nov. 27, 2008

(51) Int. Cl.
*G06F 17/00* (2006.01)

(52) U.S. Cl. ........................................ 463/42

(58) Field of Classification Search ................... 436/42, 436/40; 705/14; 273/430–432
See application file for complete search history.

(56) References Cited

U.S. PATENT DOCUMENTS

| | | | |
|---|---|---|---|
| 5,679,075 A | 10/1997 | Forrest et al. | |
| 5,791,199 A | 8/1998 | Mitchell et al. | |
| 6,210,272 B1 | 4/2001 | Brown | |
| 6,227,974 B1 | 5/2001 | Eilat et al. | |
| 6,267,379 B1 | 7/2001 | Forrest et al. | |
| 6,299,535 B1 | 10/2001 | Tanaka | |
| 6,322,074 B1 | 11/2001 | Forrest et al. | |
| 6,447,396 B1 * | 9/2002 | Galyean et al. | ................ 463/40 |
| 6,758,754 B1 | 7/2004 | Lavanchy et al. | |
| 6,783,460 B2 | 8/2004 | Galyean, III et al. | |
| 7,244,180 B2 * | 7/2007 | McHugh | ....................... 463/40 |
| 2002/0042293 A1 * | 4/2002 | Ubale et al. | .................... 463/9 |
| 2007/0033107 A1 * | 2/2007 | Ubale et al. | ................... 705/14 |

* cited by examiner

*Primary Examiner*—Ronald Laneau
(74) *Attorney, Agent, or Firm*—Jacobson Holman PLLC

(57) ABSTRACT

The on-line game site comprises a question engine coupled with a plurality of terminals controlled by respective players, for sending predefined questions to the players and for receiving answers to said questions from the players. The site allocates prizes to the players as a function of the answers it receives, where appropriate. The activity of the site is measured by a traffic index representative of the number of players that have played the game during a given time interval. The method comprises: a) displaying, together with the questions sent to players, advertising insertions paid for on the basis of a given rate; b) evaluating receipts associated with said paid-for advertising insertions; c) setting up an endowment for sharing amongst a plurality of prizes for allocation over a given period of time, the endowment being a function of the level of said receipts; d) on detecting an increase in the traffic index above a given threshold, correspondingly increasing said tariff for the advertising insertions; e) on detecting an increase in said receipts above another given threshold, correspondingly increasing said endowment; and f) continuing and developing the activity by reiterating above steps d) and e).

9 Claims, 2 Drawing Sheets

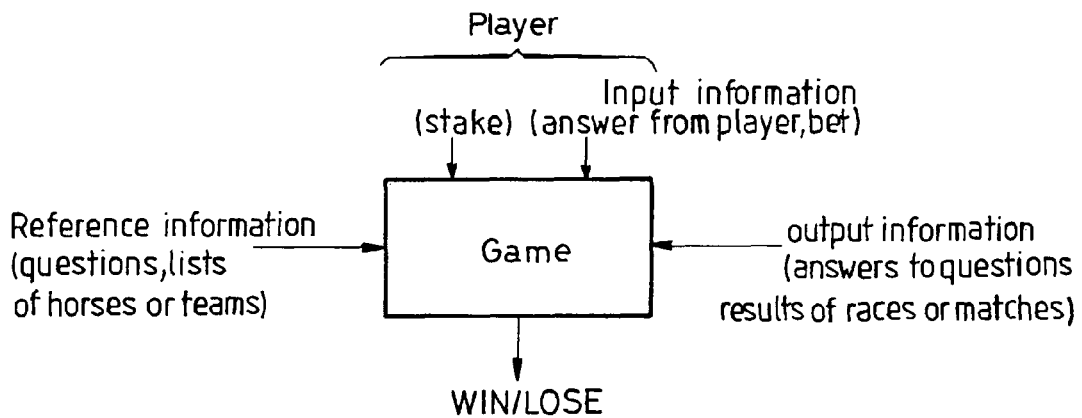
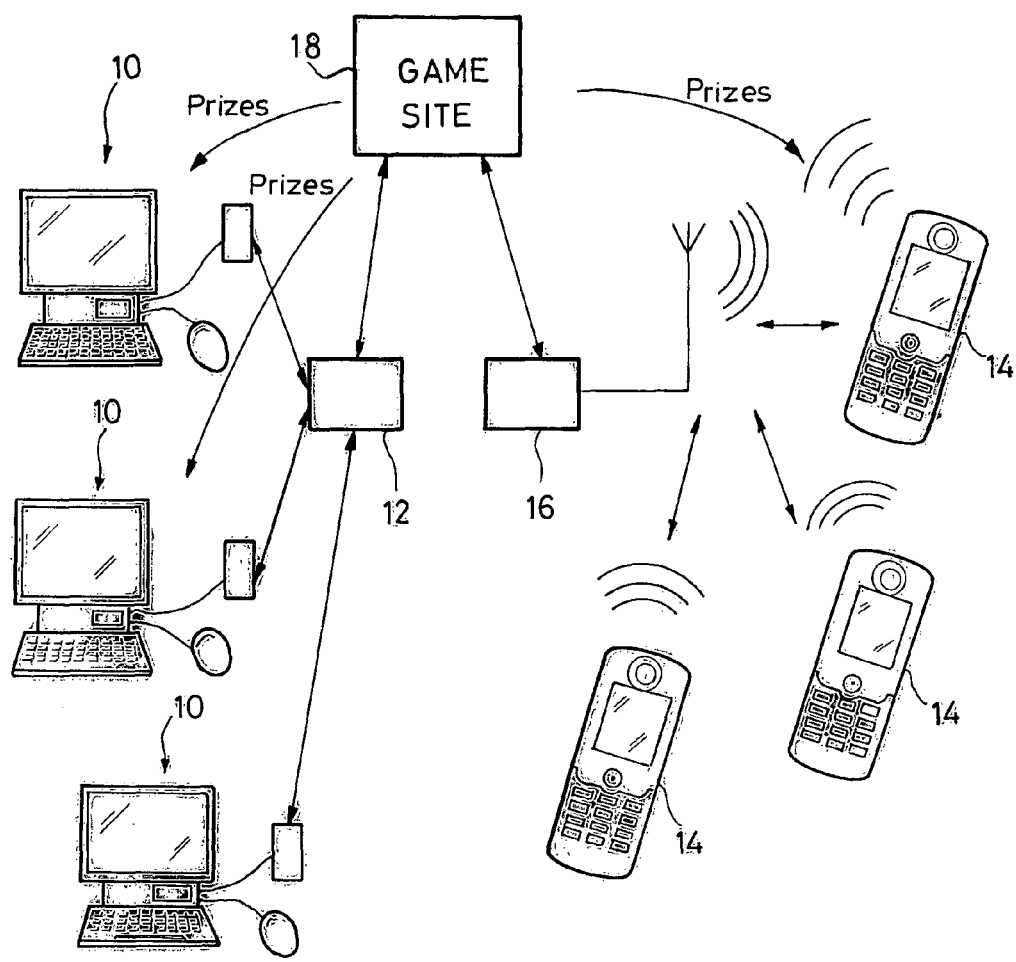

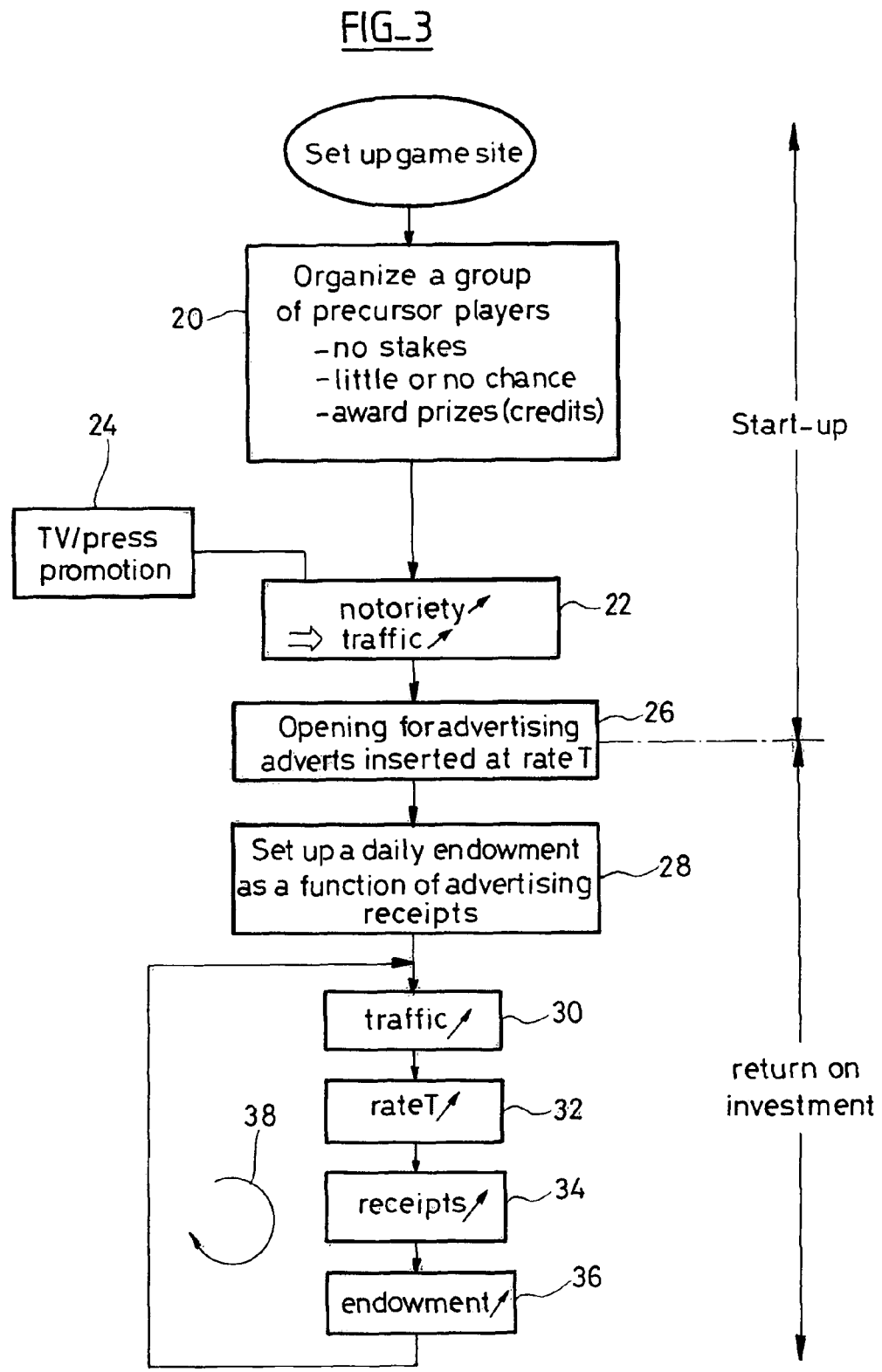

METHOD OF DEVELOPING THE ACTIVITY OF AN ON-LINE GAME SITE

CONTEXT OF THE INVENTION

1. Field of the Invention

The invention relates to a method of developing the activity of an on-line game site, more precisely a game site in which a series of questions produced by a question engine are put to players, who respond by returning answers to those questions to the site, the site allocating prizes to the players as a function of the answers it receives, where appropriate.

2. Description of Related Art

Numerous interactive electronic games are known, for example those described in U.S. Pat. No. 6,758,754 ("System and method for interactive game-play scheduled based on real-life events"); U.S. Pat. No. 6,783,460 ("Method and apparatus for coordinating an interactive computer game with a broadcast television program"); U.S. Pat. No. 6,322,074 ("Interactive quiz game system and method"); U.S. Pat. No. 6,227,974 ("Interactive game system"); U.S. Pat. No. 6,210,272 ("Multiplayer interactive electronic game for health education"); U.S. Pat. No. 5,791,199 ("Interactive consumer product promotion method and match game"); U.S. Pat. No. 5,679,075 ("Interactive multimedia game system and method"); U.S. Pat. No. 6,267,379 ("Electronically interactive location-based multimedia game system and method"); and U.S. Pat. No. 6,299,535 ("Method of processing interactive game, program product and game system for the same"); the disclosures whereof are incorporated herein by reference.

On-line games are also described in currently pending applications in the name of Moreno U.S. Ser. No. 11/138,393 of May 27, 2005 ("Computer-implemented question and answer game"); U.S. Ser. No. 11/233,501 of Sep. 23, 2005 ("Game based on combinations of words and implemented by the computer system"); and U.S. Ser. No. 11/598,228 of Nov. 13, 2006 ("Computer-implemented game based on combinations of words"); the disclosures whereof are likewise incorporated herein by reference.

Games, in particular on-line games, usually include a considerable random element, i.e. they call more on luck and chance than on the knowledge or the shrewdness of the player. Some such games are pure games of chance, such as lottery games and many casino games.

Another major characteristic of on-line games is the need for the player to bet a stake in the hope of obtaining a winning, with winnings generally increasing with increasing size of stakes. Such games thus involve players taking risks, which can put a brake on the development of the activity of the site, unless only small stakes are required, but that leads to small winnings, and thus to smaller motivation for the players.

Some game sites exist that do not require players to place stakes, however they are generally only amusement sites that recompense players only with non-monetary "points", without there being any way of obtaining an actual recompense in the form of a prize, a sum of money, a purchase voucher, etc.

One of the aims of the invention is to propose a method of developing the activity of a game site that constitutes a credible alternative to everything that has been proposed in the past.

In particular, one of the objects or the invention is to propose a novel method which, without requiring players to place any stakes at all, nevertheless gives players the hope of actual winnings.

Using such a method, another object of the invention is to develop emulation amongst existing and potential players, thus leading to a "virtuous circle" that enables the activity of the site to be increased, correspondingly making it possible to increase both the advertising receipts and the attractiveness of the game.

SUMMARY OF THE INVENTION

To this end, the invention provides a method of developing the activity of an on-line game site, for a site that comprises a question engine coupled with a plurality of terminals controlled by respective players. The site sends predefined questions to the players and it receives answers to those questions from the players. Thereafter, the site allocates prizes to the players as a function of the answers it receives, where appropriate. The activity of the site is measured by a traffic index representative of the number of players that have played the game during a time interval. The method comprises:

a) displaying, together with the questions sent to players, advertising insertions paid for on the basis of a given rate;

b) evaluating receipts associated with said paid-for advertising insertions;

c) setting up an endowment for sharing amongst a plurality of prizes for allocation over a given period of time, the endowment being a function of the level of said receipts;

d) on detecting an increase in the traffic index above a given threshold, correspondingly increasing said tariff for the advertising insertions;

e) on detecting an increase in said receipts above another given threshold, correspondingly increasing said endowment; and f) continuing and developing the activity by reiterating above steps d) and e).

Advantageously, the method may include a prior stage of starting up the site, including building up a group of precursor players for whom the questions sent are displayed without advertising insertions, until an increase in the traffic index is detected above a given initial threshold leading to a switch to a stage of opening to advertising, in which said paid-for advertising insertions are displayed together with the questions sent to the players.

Preferably, the prizes are prizes having monetary value, the given period of time for sharing the endowment is a one-day period, and/or the endowment is a predetermined percentage of said level of receipts evaluated over said given period of time preceding the allocation of the endowment.

In a particular implementation, the display of advertising insertions comprises the player responding to a question asked by the site, by making a prior selection of an advertiser from a list of several possible advertisers shown to the player. The displayed advertising insertions are then insertions specific to the advertiser as selected in this way.

The method may also make provision, on each subscription of a new player with the site, for a prior stage of determining a profile for the user. The display of advertising insertions is then personalized as a function of said profile of the player.

The increase in the rate for advertising insertions may make provision for putting a ceiling on the area of said insertions and/or on the time insertions are presented.

BRIEF DESCRIPTION OF THE DRAWINGS

A particular implementation of the invention is described below in greater detail with reference to the accompanying drawings.

FIG. 1 is a diagram showing the various parameters and items of information involved in defining and playing a game.

FIG. 2 is a diagram of a computer system enabling the invention to be implemented.

FIG. 3 is a flow chart showing the successive steps of the method of the invention.

DETAILED DESCRIPTION OF A PREFERRED IMPLEMENTATION

As shown in FIG. 1, a game, and in particular an on-line game, may be considered as an information system based on a plurality of items of information either defined by the site, or provided by the player, with winning or losing being determined by the similarity or otherwise between said items of information.

This information comprises:
reference information, e.g. stating a problem to be solved by the player, the questions produced by a question engine, lists of horses or sports teams on which bets might be placed;
input information, provided by the player: for example an answer proposed to the problem or the questions, or a combination of horses (first three, etc.), or sports teams the player hopes will win;
output information, originating internally in the site (the real solution to the problem put to the player, the exact answers to the questions), or being of external origin (the results of races or of matches); and
usually, the stake requested of the player and corresponding to the risk the player is willing to accept in the hope of winning.

The definition of these various items of information can involve chance or luck to a greater or lesser extent, or it can even be essential.

In the context of the invention, as explained below, an essentially deterministic game is selected, i.e. a game that includes only a minimal random element.

Another characteristic of the selected game is to require no stake from the player, while nevertheless allowing for the player to be tangibly gratified by genuine prizes (sums of money, purchase vouchers, articles, etc.), i.e. prizes having monetary value and not just non-monetary points. The player is confronted with tests, each enabling the player to win one such prize, solely on the basis of the merit shown.

FIG. 2 shows a computer system enabling the invention to be implemented.

The invention can advantageously be implemented by an Internet site to which the user connects using a computer, but that technique is not limiting in any way, since the invention can be implemented otherwise, providing means exist for implementing both-way, interactive data exchange between the player and a remote site, i.e. the game site organizing the playing of the various steps in the method of the invention.

In particular, the invention can be implemented by means of mobile telephones or personal digital assistants capable of exchanging data with the game site via a cellular network, using any of the well-known technologies such as SMS, WAP, GPRS, UMTS-3G, etc.

The users of such networks can thus occupy idle moments (on public transport, in waiting rooms, etc.) by playing the game of the invention, in the hope of winning prizes.

In FIG. 2, reference 10 designates microcomputers used by players. Each microcomputer 10 is connected to a telecommunications network, which in this example is a terrestrial wired network such as the telephone network (in switched mode or in DSL mode), a cable TV network, or indeed a connection to the Internet via a common server having a plurality of stations.

The game may also be implemented by cell phones 14 having functions that enable them to exchange digital data using various well-known technologies such as SMS, WAP, GPRS, or UMTS-3G.

The computer terminals 10 or telephone terminals 14 are connected via appropriate respective interfaces 12, 16 to a game site 18 suitable for exchanging digital data with the terminals.

Each of the terminals can display text messages on a screen, in particular information received from the game site 18, with it being possible for a player to key-in alphanumeric data and send it in return to the game site 18.

In this respect, the game site 18, in combination with the interfaces 12 and 16, performs message formatting as a function of the type of terminal in use, i.e. computer or telephone terminal. Thus, for computer terminals 10, messages are formatted in such a manner as to enable them to be received and displayed in the form of web pages readable using a browser, while for mobile telephones, messages are, for example, formatted as WAP pages, that are more suitable for displaying on a screen of small size. Nevertheless, it should be observed that the content of the messages formatted by the game site 18 and by the interfaces 12 and 16, i.e. the wording of the information exchanged with the various terminals, is identical regardless of the formatting, and that the only difference lies in the layout whereby information can be displayed by computer terminals or by telephone terminals.

Furthermore, the computer and telephone terminals 10 and 14 are not dedicated to a particular user. A single user can have both a computer terminal 10 and a telephone terminal 14, either of which can be used depending on circumstances, for example depending on whether the user is at home or away. The user needs merely to be identified by the game site 18 using a conventional protocol, e.g. by dialing or keying-in a special telephone number or address, as the case may be, and then sending a subscriber number or identifier (login) and a password.

The activity of the site is measured by a traffic index, representative of the number of players participating in the game over a given time interval, e.g. the number of different players that connect to the site over a single day.

The game hosted by the site 18 is a game of the question-and-answer type, where the questions are generated by a question engine sending predefined questions to a player, and receiving answers from the player, with the pertinence of the answers being evaluated by the site to allocate, where appropriate, prizes to players as a function of the answers received.

There are very many games of this type in existence: hangman, riddles, Scrabble (registered trademark), crossword puzzles, etc. The game selected for implementation by the site is preferably a game that relies little or not at all on luck, thus enabling a player to win depending on the merit of the answers given.

A preferred example is the game described in the above-mentioned application U.S. Ser. No. 11/598,229 (Moreno), the disclosure of which is incorporated herein by reference. In that game, starting from a starting word submitted by the site, the player must find a series of additional words which, when combined with the starting word, maximizes the number of hits for said combination of words when submitted to a search engine.

To simplify the description, the example described is nevertheless the game of hangman, which is one of the simplest games that it is possible to implement in the context of the invention.

The various stages of the process of developing the game site in accordance with the teaching of the invention are shown in FIG. 3.

Once the site has been put into place, an information campaign attracts surfers to the site so as to constitute a group of "precursor players" (step 20) acting, in a first stage, to trigger the development of the site.

For example, a simultaneous launch of the same game on a TV channel can incite surfers to play on the site, in particular because of a characteristic of the site that is put forward by the information campaign, i.e. the possibility of receiving actual winnings, for example a sum of money.

The surfer thus subscribes to the game site, giving an e-mail address and also a postal address so as to be able subsequently to receive prizes. No stake is requested of the user.

Once a subscriber, the user is faced with a first test, for example a game of hangman with the site submitting:
T _ _ _ _ _ _ E
The player then tries the letter "A". Result: fail.
The player then tries the letter "R". Result: fail.
The player tries the letter "E". Result:
T E _ E _ _ _ _ E
The player tries the letter "L". Result:
T E L E _ _ _ _ E
The player tries the letter "P". Result:
T E L E P _ _ _ E
The player then guesses the word TELEPHONE and wins 9−2=7 points (9 letters for the word, minus 2 failures before reaching the solution).

The player's account is credited with a corresponding sum, e.g. $0.7 by defining a "point rate" of 0.1.

Another example of a game suitable for being proposed on the site is that of forecasting sports events.

For example, the player has a capital of 1000 points. For the World Cup, the player stakes 100 points at 10 to 1 on Italy against France and 10 points at 2 to 1 on Germany against Canada. Italy wins and Germany loses: the player's account is then automatically credited with 10×100=1000 points for the first bet, and debited by 2×10=20 points for the second bet.

After a few days, the player can thus accumulate a small sum, e.g. about $20, which can be paid to the player by appropriate means: a check in an envelope, a transfer to a bank account, credit on a telephone bill, etc.

The player is bound to spread the word about this good fortune to surfer friends.

As a result, the notoriety and the traffic of the site will increase (step 22), to reach several tens or hundreds of thousands of players.

This threshold is sufficient to attract the interest of advertisers, who will then apply to the operator of the site to place advertisements, e.g. banner type insertions or the like displayable on the screen presented to players.

The site thus opens to advertising (step 26). The operators of the site then begin to earn money, in amounts that are considerably greater than the costs of running the site: this begins a stage of a return on investment following the start-up stage.

The following step consists in setting up a daily endowment as a function of advertising revenues (step 28).

The site then lets it being known that henceforth it will pay players 50% of its advertising revenues, for example.

If daily revenues amount to $12,000, for example, then the site will pay out $6000 per day, subdivided into 111 prizes:
1 prize of $2000;
10 prizes of $200;
100 prizes of $20.

Such an outlook greatly increases the interest of surfers, who will be ever more numerous in their daily visits to the site (step 30). This enables the operator to raise advertising rates (step 32) accordingly.

This leads to an increase in receipts (step 34) and thus to an increase in the endowment that can be made available to players (step 36).

This increase in the endowment will itself lead to a further increase in traffic, thus making another increase in advertising rate possible, and thus in receipts, and so on, thereby triggering a "virtuous circle" (represented by the loop 38) suitable for further increasing the activity of the site.

Other variants can be applied to the implementation as described above.

For example, the display of advertisements can be made more interactive and specific by displaying at the beginning of a session a selection bar enabling the player to specify the advertiser or a group of advertisers whose banners will subsequently be displayed to the player during remainder of the session, or during all or part of a round.

The player can thus have the opportunity to select one particular theme from a plurality made available such as: computing, finance, cars, fashion, holidays, etc.

The player can also be asked to select an advertiser from amongst several, and even which of the various banners of that particular advertiser the player desires to see subsequently.

This technique serves to guarantee privileged exposure for a given trademark, and that also corresponds to the tastes and the personality of the player (since the player selected it), thus having better impact and justifying a higher rate for each insertion.

The various trademarks and banners can be selected in compliance with rules set out by an advertising space purchasing service as a function of guidelines relating to the way in which the advertiser seeks to ensure the presence of the trademark: duration of exposure to the trademark (determining the duration of the game or of a round of the game), time of day, periodicity, etc.

In general, in order to preserve the attractiveness of the site, it is nevertheless desirable to put a ceiling on the area and/or the time advertising insertions are presented.

It is also possible to personalize advertising insertions by making them contextual, in the manner used by Adword or Adsense (trademarks registered by Google, Inc.) systems.

The insertions are then selected as a function of a qualitative profile of the player set up on the basis of a questionnaire filled in the by player when subscribing to the site.

By way of example, the profile questionnaire may be made up of a large number of closed, multiple-choice questions serving to evaluate the most personal tastes of the player. For example:
what are you doing next Sunday: cinema, theater, circus, restaurant, or museum?
do you prefer Shakespeare, Victor Hugo, or Tolstoy?
what is your favorite flower: carnation, rose, anemone, or orchid;
etc.

This makes it possible to avoid cluttering the screen presented to players by the site with ever more intrusive banners, it being possible to replace them by small blocks (typically 128×128 pixels), or by hypertext links pointing to the sites of the advertisers as selected in this way as a function of the profile of the player.

The invention claimed is:
1. A method of developing the activity of an on-line game site, the site comprising a question engine coupled to a plu- rality of terminals controlled by respective players, for sending predefined questions to the players and for receiving replies to said predefined questions from the players, the site awarding prizes to the players as a function of the answers received, where appropriate;

the activity of the site being measured by a traffic index representative of the number of players that have played the game over a given time interval;

the method comprising:
a) displaying on the terminals, together with the questions sent to players, advertising insertions paid for on the basis of a given rate;
b) evaluating receipts associated with said paid-for advertising insertions;
c) setting up an endowment for sharing amongst a plurality of prizes for allocation over a given period of time, the endowment being a function of the level of said receipts;
d) on detecting an increase in the traffic index above a given threshold, correspondingly increasing said tariff for the advertising insertions;
e) on detecting an increase in said receipts above another given threshold, correspondingly increasing said endowment; and
f) continuing and developing the activity by reiterating above steps d) and e).

2. The method of claim 1, including a prior stage of starting up the site, including building up a group of precursor players for whom the questions sent are displayed without advertising insertions, until an increase in the traffic index is detected above a given initial threshold leading to a switch to a stage of opening to advertising, in which said paid-for advertising insertions are displayed together with the questions sent to the players.

3. The method of claim 1, in which said prizes are prizes having monetary value.

4. The method of claim 1, in which said given time period for sharing the endowment is a period of one day.

5. The method of claim 1, in which said endowment is a predetermined percentage of said level of the receipts evaluated over said given period of time preceding the allocation of the endowment.

6. The method of claim 1, in which the display of advertising insertions comprises the player responding to a question asked by the site, by making a prior selection of an advertiser from a list of several possible advertisers shown to the player, the displayed advertising insertions then being insertions specific to the advertiser as selected in this way.

7. The method of claim 1, comprising, on each new subscription of a player with the site, a prior stage of determining the player's profile, and in which the display of advertising insertions is personalized as a function of said profile of the player.

8. The method of claim 1, in which said increase in the tariff for advertising insertions is an increase with a ceiling on the area of said insertions.

9. The method of claim 1, in which said increase in the tariff for the advertising insertions is an increase with a ceiling on the presentation time of said insertions.

* * * * *